United States Patent Office 2,978,445
Patented Apr. 4, 1961

2,978,445

CHROMIUM-CONTAINING MONOAZO DYESTUFFS

Walter Benade and Gerhard Dittmar, Leverkusen, and Walter Scholl, Koln-Mulheim, Germany, assignors to Farbenfabriken Bayer Aktiengesellschaft, Leverkusen, Germany, a corporation of Germany No Drawing. Filed July 25, 1958, Ser. No. 750,889
Claims priority, application Germany Aug. 7, 1957
4 Claims. (Cl. 260—147)

The present invention relates to new chromium-containing monoazo dyestuffs; more particularly it relates to chromium complexes of monoazo dyestuffs corresponding to the formula

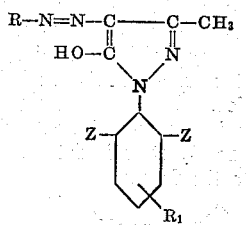

In this formula R stands for the radical of a 1-hydroxy-2-amino-4-alkyl-6-nitrobenzene, 1-hydroxy - 2 - amino-4-halo-6-nitrobenzene, 1-hydroxy - 2 - amino-4,6-dihalobenzene and 1-hydroxy-2-amino-4-halobenzene, Z means a lower alkyl radical or a halogen atom and $R_1$ stands for a sulfonamide group.

The new azo dyestuffs are obtainable by treating monoazo dyestuffs of the general formula

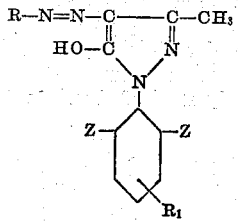

wherein R means one of the diazo compounds as mentioned above or an O-alkyl ether or -ester, and Z and $R_1$ have the same meaning as above, in substance or on a substrate with chromium-yielding agents.

As diazo components which may be used for the preparation of the monoazo dyestuffs there may be mentioned: 1-hydroxy-2-amino - 4 - methyl-6-nitrobenzene, 1-hydroxy-2-amino-4-ethyl - 6 - nitrobenzene, 1-hydroxy-2-amino-4-chlorobenzene, 1 - hydroxy-2-amino-4,6-dichlorobenzene, and 1-hydroxy-2-amino-4-chloro-6-nitrobenzene.

Suitable coupling components are for example: 1-(2'-methyl-6'-chloro-4'-sulfamido)-phenyl-3-methyl-5-pyrazolone, 1 - (2',6'-dimethyl-4'-sulfamido)-phenyl-3-methyl-5-pyrazolone, 1-(2',6'-dimethyl - 3' - sulfamido) - phenyl-3-methyl - 5 - pyrazolone, 1-(2'-methyl-6'-chloro-4'-methyl-sulfamido)-phenyl-3-methyl-5-pyrazolone.

The diazotized amines are combined with the said coupling components by known methods, expediently in a weakly alkaline to soda alkaline medium. The monoazo dyestuffs obtainable in good yield are already suitable for the dyeing of wool by the single-bath chrome process, dyeings in red to orange shades thus being obtained.

Especially valuable are however the chromium complex compounds produced in substance. The production of these complex compounds is effected by those methods known in literature leading according to experience to the so-called 1:2 complexes, preferably according to the process described in German patent specification No. 929,567.

When the monoazo dyestuffs are produced with the use of o-aminophenol alkyl ethers or -phenol esters as diazo components, the metallisation is effected under conditions under which the ether or ester grouping is split. Suitable processes for dealkylating metallizations are described, for example, in French patent specification No. 1,083,204.

The chromium-containing monoazo dyestuffs obtainable according to the present process are dark red to orange brown powders which readily dissolve in water with a red to orange colour. They dye wool and materials of similar dyeing properties such as silk, leather, polyamides and polyurethanes, preferably from a neutral to organic acid bath, in very level and fast brilliant bluish red shades.

The following examples are given for the purpose of illustrating the invention, the parts by weight and the parts by volume being in the ratio of grams to millilitres.

Example 1

16.8 parts by weight of 2-amino-1-hydroxy-4-methyl-6-nitrobenzene are suspended with 50 parts by volume of water and 14 parts by volume of hydrochloric acid (d.=1.20). The suspension is cooled to 0° with 100 parts by weight of ice and diazotized by the addition of a solution of 6.9 parts by weight of sodium nitrite in 25 parts by volume of water. The diazo compound partially precipitates in a yellowish brown form. The diazo compound is run with good stirring within 10 minutes into a solution prepared from 33 parts by weight of 1-(2'-chloro-6'-methyl-4'-sulfamido)-phenyl-3-methyl-5-pyrazolone, 150 parts by volume of water, 15 parts by volume of sodium hydroxide solution (40° Bé.) and 28 parts by weight of sodium carbonate. The reaction mixture is kept at 0 to +5° C. by adding about 200 parts by weight of ice. The coupling is completed after a few hours; the precipitated dyestuff is filtered off with suction and purified by washing with a 5 percent common salt solution.

The dyestuff corresponds to the formula

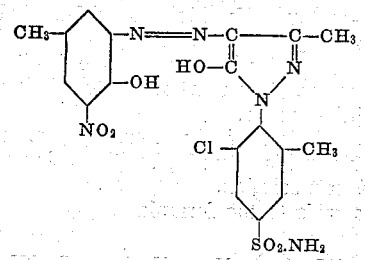

After drying, it is a dark red powder which dissolves in water with a red colour. The dyestuff dyes wool by the single-bath chrome process in fast clear red shades.

Example 2

The dyestuff obtainable by the process described in Example 1 is dissolved in 2000 parts by volume of water with 8 parts by weight of sodium hydroxide at 100° C. Within 10 minutes, a solution of 7.35 parts by weight of potassium bichromate and 13.5 parts by weight of glucose in 100 parts by volume of water is added dropwise. The reaction mixture is kept at 100° C. for 45 minutes, then cooled to 75° C., the chromium complex compound formed is separated out by the addition of 300 parts by weight of rock salt, isolated and dried.

The dry chromium complex dyestuff is a reddish brown powder which easily dissolves in water with a red colour and dyes wool from a neutral or organic acid bath in level and fast clear red shades.

A chromium complex dyestuff of similar properties is obtainable by using, instead of 16.8 parts by weight of 2-amino-1-hydroxy-4-methyl-6-nitrobenzene in Example 1, 18.2 parts by weight of 2-amino-1-hydroxy-4-ethyl-6-nitrobenzene and otherwise proceeding similarly to Examples 1 and 2.

Example 3

A diazo compound obtainable according to the method of Example 1 is run with stirring within 10 minutes into a solution of 30 parts by weight of 1-(2',6'-dimethyl-4'-sulfamido)-phenyl-3-methyl-5-pyrazolone, 6 parts by weight of sodium hydroxide and 28 parts by weight of sodium carbonate in 150 parts by volume of water which is kept at 0° C. by the addition of ice. After completion of the coupling, the precipitated monoazo dyestuff is filtered off with suction and washed on the suction-filter with a 5% salt solution. The dyestuff corresponds to the formula

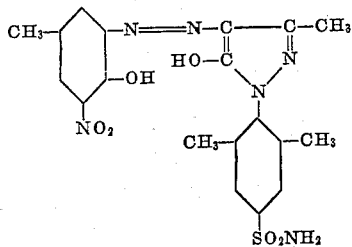

It dyes wool by the single-bath chroming process in clear red shades.

Example 4

The dyestuff obtainable according to Example 3 is converted into a chromium complex dyestuff by the process of Example 2.

The dry chromium-containing dyestuff is a dark red powder which readily dissolves in water with a red colour and dyes wool from a neutral and also an organic acid bath in level fast brilliant red shades. The dyeings are somewhat more yellow than the dyeings obtained with the chromium complex dyestuff of Example 2.

Example 5

A diazo compound obtainable according to the process of Example 1 is added with stirring within 10 minutes to a solution of 34.5 parts by weight of 1-(2'-methyl-6'-chloro-4'-methyl-sulfamido)-phenyl-3-methyl-5-pyrazolone, 6 parts by weight of sodium hydroxide and 28 parts by weight of sodium carbonate in 150 parts by volume of water. The reaction mixture is kept at 0° C. by the addition of ice.

After completion of the coupling, the precipitated monoazo dyestuff is filtered off with suction and washed with a 5% salt solution.

It corresponds to the formula

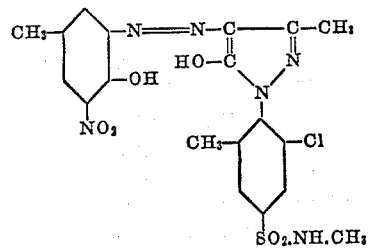

The dyestuff is converted into the 1:2 chromium complex compound according to the process of Example 2; the chromium-containing dyestuff dyes wool from a neutral bath in shades similar to those of the dyestuff of Example 2. The dyeings are however somewhat faster to wetting.

Example 6

1 gram of the dyestuff chromium complex obtainable according to Example 2 is dissolved in 3 litres of permutite water with the addition of 5 grams of ammonium acetate. 100 grams of wool skein is introduced at 40° C. and the temperature of the dye-bath is raised to boiling point within 30 minutes. The material is dyed at boiling temperature for 60 minutes and rinsed. A clear fast red dyeing is thus obtained.

Example 7

16.8 parts by weight of 2-amino-1-hydroxy-4-methyl-6-nitrobenzene are stirred with 50 parts by volume of water and 14 parts by volume of hydrochloric acid (d.=1.2). The mixture is treated with 100 parts by weight of ice and diazotized by the addition of 6.9 parts by weight of sodium nitrite dissolved in 25 parts by volume of water. The suspension of the diazo compound is then run with good stirring into a solution prepared from 31 parts by weight of 1-(2',6'-dimethyl - 3' - sulfamido)-phenyl-3-methyl-5-pyrazolone, 150 parts by the volume of water, 15 parts by volume of sodium hydroxide solution (40° Bé.) and 28 parts by weight of sodium carbonate. The temperature of the reaction mixture is kept at 0° C. by the addition of ice.

The coupling is terminated next morning; the precipitated monoazo dyestuff is filtered off with suction; it corresponds to the formula

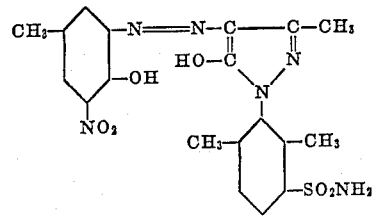

The chromium complex compound of this dyestuff obtainable according to the process of Example 2 is after drying a red powder which dyes wool from a neutral or organic acid bath in somewhat more yellowish red shades than the dyestuff of Example 2.

Example 8

14.3 parts by weight of 4-chloro-2-amino-1-hydroxybenzene are diazotized in 50 parts by volume of water and 14 parts by volume of hydrochloric acid (d.=1.20) at 0° C. by the addition of 6.9 parts by weight of sodium nitrite. The diazo compound thus obtained is run with good stirring within 10 minutes into a solution of 32.5 parts by weight of 1-(2',6'-dimethyl-3'-methyl-sulfamido-phenyl-3-methyl-5-pyrazolone, 150 parts by volume of water, 15 parts by volume of sodium hydroxide solution (40° Bé.) and 28 parts by weight of sodium carbonate. The reaction mixture is kept at 0 to +5° C. by the addition of ice. The coupling is terminated after a few hours. The precipitated dyestuff is isolated. It corresponds to the formula

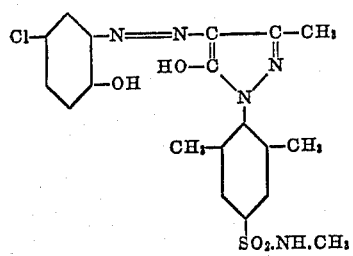

The dry dyestuff is a brown red powder which readily dissolves in water with an orange-red colour and dyes wool by the single-bath chromium process in fast red shades.

(b) The dyestuff obtainable according to process (a) is dissolved in 2000 parts by volume of water with 8 parts by weight of sodium hydroxide at 100° C. Within 10 minutes a solution of 7.35 parts by weight of potassium bichromate and 13.5 parts by weight of glucose in 100 parts by volume of water is added dropwise with stirring, a temperature of 95–100° C. is then maintained for 45 minutes, the mixture is cooled to 75° C. and the chromium complex compound thus formed is separated out by the addition of 250 parts by weight of rock salt and a little sodium hydrogen carbonate.

The dry chromium complex dyestuff is a brown red powder which readily dissolves in water with a red colour. Wool is dyed from a neutral or organic acid bath in yellowish red shades.

If instead of 31 parts by weight of 1-(2',6'-dimethyl-3'-methylsulfamido)-phenyl-3-methyl-5-pyrazolone there is used in this example 33 parts by weight of 1-(2'-chloro-6'-methyl-4'-sulfamido)-phenyl-3-methyl-5-pyrazolone and otherwise proceeding in an analogous manner, a chromium complex compound is obtained which dyes wool in somewhat more bluish red shades.

Example 9

17.8 parts by weight of 4,6-dichloro-2-amino-1-hydroxybenzene are diazotized within 30 minutes in 60 parts by volume of water and 28 parts by volume of hydrochloric acid (d.=1.18) at 6° C. with 6.9 parts by weight of sodium nitrite dissolved in 20 parts by volume of water.

The diazo compound is then run into a solution prepared from 31 parts by weight of 1-(2',6'-dimethyl-3'-sulfamido)-phenyl-3-methyl-5-pyrazolone, 150 parts by volume of water, 38 parts by volume of sodium hydroxide solution (40° Bé.) and 28 parts by weight of sodium carbonate. The coupling mixture is kept at 0 to +5° by cooling with ice.

The coupling is completed after a few hours, the precipitated dyestuff is filtered off. It corresponds to the formula

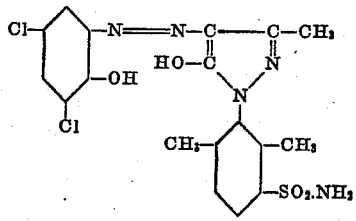

The monoazo dyestuff thus obtained is converted into the chromium complex compound by the process of Example 8(b). After drying, it is a dark brown red powder which readily dissolves in water with a red colour. Wool is dyed from a neutral and also from an organic acid bath in fast level red shades. The shade is somewhat more yellow than that of dyeings obtained with the dyestuff of Example 8(b).

Example 10

18.9 parts by weight of 6-nitro-4-chloro-2-amino-1-hydroxybenzene are dissolved hot in 250 parts by volume of water and 14 parts by volume of sodium hydroxide solution (40° Bé.). The solution is cooled to 20° C. and treated with 6.9 parts by weight of sodium nitrite. This solution is slowly run with good stirring into a mixture of 42 parts by volume of hydrochloric acid (d.= 1.18) and 150 parts by weight of ice. The mixture is after-stirred for 30 minutes. The diazo compound precipitates with a yellow brown colour.

The suspension thus obtained is added with good stirring to a solution prepared from 33 parts by weight of 1-(2'-chloro-6'-methyl-4'-sulfamido)-phenyl-3-methyl-5-pyrazolone, 150 parts by volume of water, 38 parts by volume of sodium hydroxide solution 40° Bé. and 28 parts by weight of sodium carbonate. The reaction mixture is kept at 0 to +5° C. by the addition of ice. When the coupling is completed, the separation of the monoazo dyestuff thus formed is completed by the addition of 100 parts by weight of rock salt; the dyestuff is then isolated. It corresponds to the formula

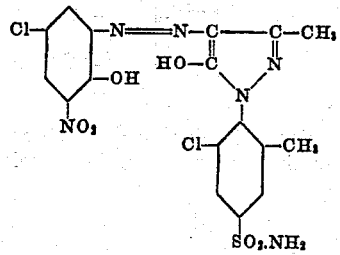

and dyes wool by the single-bath chroming process in fast bluish red shades.

The monoazo dyestuff thus obtained is converted into its chromium complex compound according to the process of Example 8(b). The latter is, after drying, a red powder which readily dissolves in water with a red colour and dyes wool from a neutral or organic acid bath in fast and level bluish red shades.

If instead of 1-(2'-chloro-6'-methyl-4'-sulfamido)-phenyl-3-methyl-5-pyrazolone 31 parts by weight of 1-(2',6'-dimethyl-3'-sulfamido)-phenyl-3-methyl-5-pyrazolone are used and proceeding in an analogous manner a dyestuff of similar dyeing properties is thus obtained.

We claim:

1. A complex chromium compound containing one atom of chromium bound in complex union with substantially two monoazo dyestuff molecules of the following formula

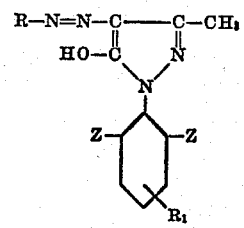

wherein R stands for a diazo component selected from the group consisting of a radical of 1-hydroxy-2-amino-4-lower alkyl-6-nitrobenzene, 1-hydroxy-2-amino-4-chloro-6-nitrobenzene, 1-hydroxy-2-amino-4,6-dichlorobenzene and 1-hydroxy-2-amino-4-chlorobenzene, Z stands for a radical selected from the group consisting of lower alkyl and chlorine, and $R_1$ means a sulfonamide group.

2. A complex chromium compound containing one atom of chromium bound in complex union with substantially two monoazo dyestuff molecules of the following formula

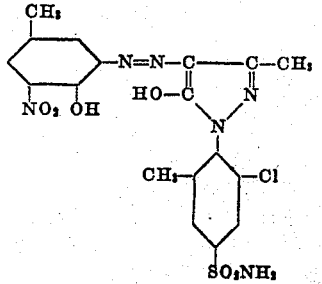

3. A complex chromium compound containing one atom of chromium bound in complex union with substantially two monoazo dyestuff molecules of the following formula

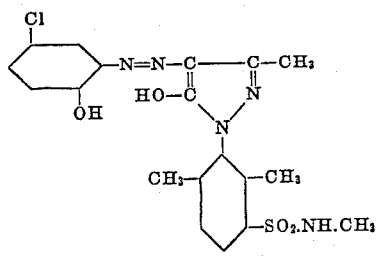

4. A complex chromium compound containing one atom of chromium bound in complex union with substantially two monoazo dyestuff molecules of the following formula

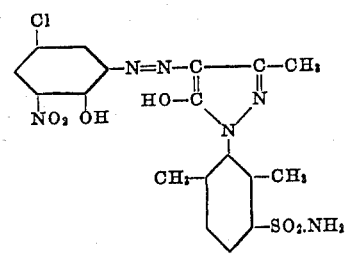

References Cited in the file of this patent
UNITED STATES PATENTS

| | | |
|---|---|---|
| 2,040,368 | Fischer | May 12, 1936 |
| 2,673,201 | Zickendraht et al. | Mar. 23, 1954 |
| 2,826,572 | Kuster et al. | Mar. 11, 1958 |